United States Patent
Sobczyk

(10) Patent No.: US 10,252,359 B2
(45) Date of Patent: Apr. 9, 2019

(54) METHOD FOR DETERMINING THE FLANK FACE CONTOUR OF A GEAR SKIVING TOOL, GEAR SKIVING TOOL AND USE THEREOF

(71) Applicant: Profilator GmbH & Co. KG, Wuppertal (DE)

(72) Inventor: Marcel Sobczyk, Solingen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 304 days.

(21) Appl. No.: 14/440,093

(22) PCT Filed: Nov. 7, 2013

(86) PCT No.: PCT/DE2013/000653
§ 371 (c)(1),
(2) Date: May 1, 2015

(87) PCT Pub. No.: WO2014/075651
PCT Pub. Date: May 22, 2014

(65) Prior Publication Data
US 2015/0314382 A1 Nov. 5, 2015

(30) Foreign Application Priority Data
Nov. 16, 2012 (DE) .................. 10 2012 022 439

(51) Int. Cl.
*B23F 5/16* (2006.01)
*B23F 21/16* (2006.01)
*B23F 21/00* (2006.01)

(52) U.S. Cl.
CPC .............. *B23F 5/163* (2013.01); *B23F 21/00* (2013.01); *B23F 21/16* (2013.01); *Y10T 407/1715* (2015.01)

(58) Field of Classification Search
CPC ........... B23F 21/00; B23F 21/16; B23F 5/163
See application file for complete search history.

(56) References Cited

U.S. PATENT DOCUMENTS 2,338,528 A * 1/1944 Miller ................ B23F 19/06
409/33
3,264,940 A * 8/1966 Wildhaber .............. B23F 5/202
407/28

(Continued)

FOREIGN PATENT DOCUMENTS

| CN | 2206172 Y | 8/1995 |
| CN | 2759664 Y | 2/2006 |

(Continued)

OTHER PUBLICATIONS

Hobohm, "Ein Verfahren entfalted sein Potenzial", Werkstatt und Betrieb, Carl Hanser Verlag Gmbh & Co. KG, Germany, Bd. 144. Nr. 12., 31. Dec. 31, 2011, pp. 46-49, XP001571035, ISSN: 0043-2792.

(Continued)

*Primary Examiner* — Sara Addisu
(74) *Attorney, Agent, or Firm* — McGlew and Tuttle, P.C.

(57) ABSTRACT

A clearance angle, of a blade-like tool or tool tooth of a tool for hob peeling workpieces is determined by defining the rake face contour of the tool and calculating the progression of path movement of the rake face during chip-breaking hob peeling, taking into account a pre-determinable transmission ratio between the tool and the workpiece determined by the respective number of teeth, and the desired tooth cross-section contour of the tool, and determining a tangential speed for points of the cutting edge of the tool during chip-breaking, wherein hob peeling is determined in the form of vectors that are displayed graphically as bundles for each point on the cutting-edge and a closed envelope surface is determined, which plus a desired clearance angle is (Continued)

selected as the shape for the flank face contour of the tool or of the flank face of the tool tooth. A tool is also provided.

12 Claims, 4 Drawing Sheets

(56) References Cited

U.S. PATENT DOCUMENTS

| | | | | |
|---|---|---|---|---|
| 3,931,754 | A * | 1/1976 | Nishijima | B23F 5/163 407/28 |
| 5,174,699 | A * | 12/1992 | Faulstich | B23F 5/163 409/26 |
| 5,377,457 | A * | 1/1995 | Loos | B23F 5/02 407/27 |
| 9,108,258 | B2 * | 8/2015 | Stadtfeld | B23F 15/06 |
| 2011/0268523 | A1* | 11/2011 | Heinemann | B23F 5/163 409/12 |
| 2013/0266391 | A1* | 10/2013 | Schweiker | B23F 5/163 409/51 |
| 2014/0234043 | A1* | 8/2014 | Nakahara | B23F 5/20 409/12 |

FOREIGN PATENT DOCUMENTS

| | | |
|---|---|---|
| CN | 101069936 A | 11/2007 |
| CN | 101342619 A | 1/2009 |
| DE | 243 514 C | 2/1912 |
| DE | 41 22 460 C1 | 4/1992 |
| DE | 4216329 C1 | 2/1993 |
| DE | 10 2007 015357 A1 | 10/2008 |
| DE | 10 2008 037 514 A1 | 5/2010 |
| DE | 10 2009 025 945 A1 | 12/2010 |
| DE | 20 2011 050054 A1 | 9/2011 |
| DE | 102011009027 A1 | 7/2012 |
| WO | 2010/060 733 A1 | 6/2010 |
| WO | 2012/098 002 A1 | 7/2012 |

OTHER PUBLICATIONS

International Search Report dated Nov. 4, 2014.
German Search Report dated Sep. 3, 2013.

* cited by examiner

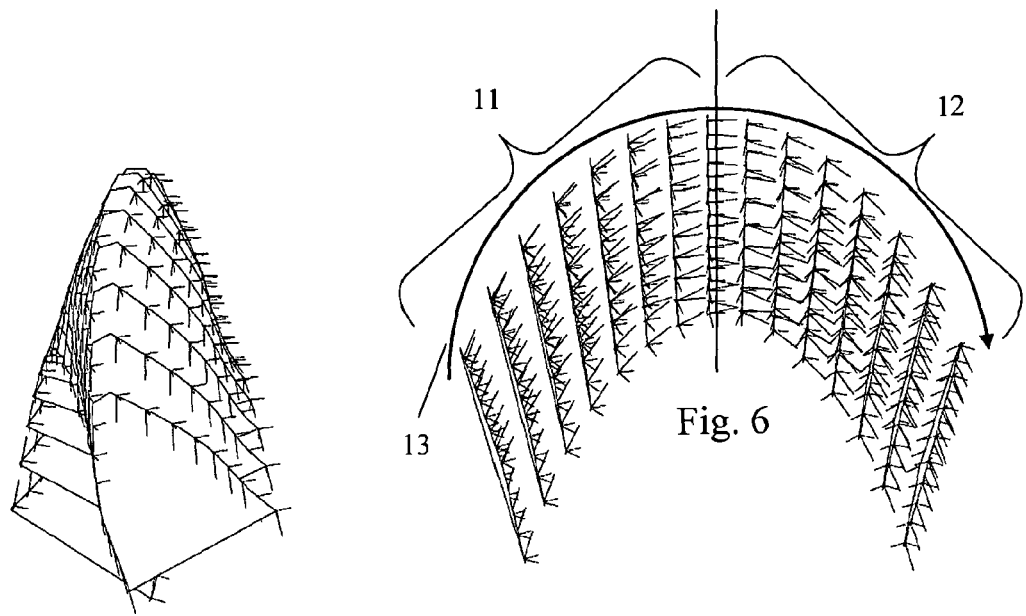
Fig. 6
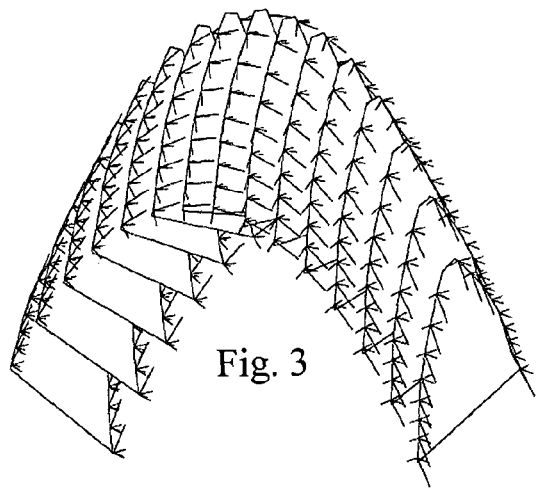
Fig. 4
Fig. 3
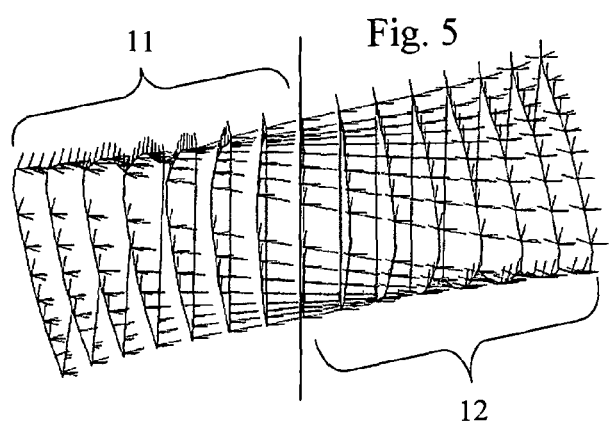
Fig. 5

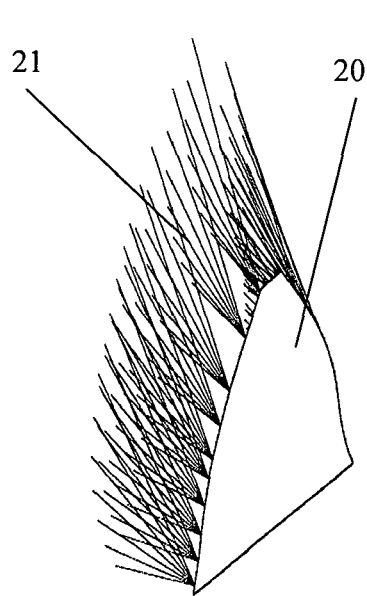
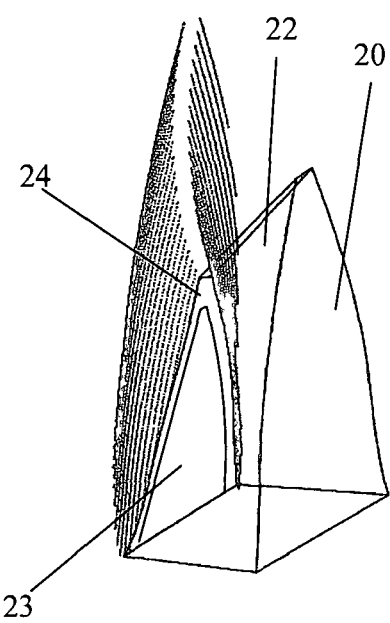
Fig. 7          Fig. 8
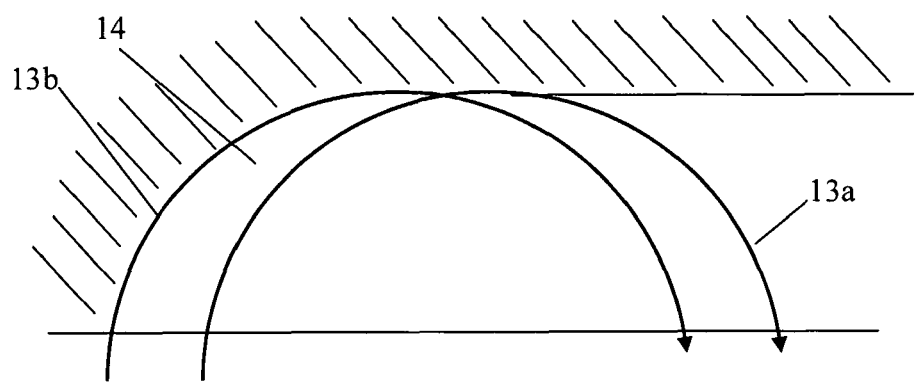
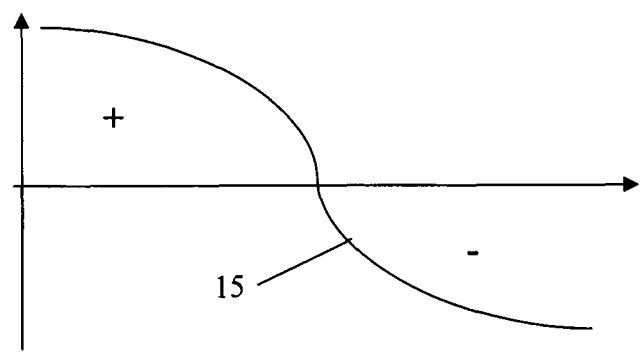
Fig. 9

METHOD FOR DETERMINING THE FLANK FACE CONTOUR OF A GEAR SKIVING TOOL, GEAR SKIVING TOOL AND USE THEREOF

CROSS REFERENCE TO RELATED APPLICATIONS

This application is a United States National Phase Application of International Application PCT/DE2013/000653 filed Nov. 7, 2013 and claims the benefit of priority under 35 U.S.C. § 119 of German Patent Application DE 10 2012 022 439.7 filed Nov. 16, 2012, the entire contents of which are incorporated herein by reference.

FIELD OF THE INVENTION

The invention relates to a method for determining the flank face contour, more particularly the clearance angle, of a blade-like tool or tool tooth of a tool for the gear skiving of workpieces, and also to a tool for gear skiving, comprising a plurality of teeth, each having faces with cutting edges and, adjoining hereto, flank faces, which teeth are arranged on a cylindrical or conical shell, wherein the tool can be driven rotatably about a tool axis spaced a radial distance away from the workpiece axis and can be advanced into rolling engagement at a crossed-axes angle between the rotational axis of a driven workpiece and the tool rotational axis, and finally to the use of said tool or of the tool produced according to the method.

BACKGROUND OF THE INVENTION

The first metal-cutting machining methods of the type stated in the introduction are known from DE 243 514 C. The gear skiving uses as the tool a toothed wheel having end-face cutters. Unlike in slotting, the cutting motion is realized in that, via a skewed arrangement of the axis of the tool and the rotational axis of the workpiece, a cutting motion is generated by oppositely directed rotations of these parts. As it circulates around the workpiece, the tool passes respectively through toothings which it cuts out of the workpiece.

In principle, a workpiece can be produced in gear skiving in a single pass with just one performed feed motion. In the case of greater material removal, however, several passes are sensible, in which the peeling tool consecutively executes two feed motions with differently large cutting depths, as is described, for instance, in DE 10 2008 037 514 A1.

In order to improve the quality of the produced workpiece, in WO 2012/098 002 A1, it is proposed that the workpiece-axis-parallel components of the feed motion and of the cutting motion are directed oppositely to each other.

WO 2010/060733 A1 relates to a gear skiving apparatus in which an electronic control device for positioning drives of the tool spindle and of the workpiece are provided, wherein the control device, in the tooth cutting of a crudely toothed or untoothed blank, in the axial feed at the end of the feed overlays a radial emergence motion from the workpiece and/or at the start of the feed a radial immersion motion into the workpiece.

Regardless of whether the gear skiving tool known according to the prior art has as the tool a cylindrical or a conical contour, fundamentally the same rolling motions are obtained in the metal-cutting process, i.e. the tool operates with and without a face offset. However, due to the path motion of the tool relative to the workpiece, at each moment of the engagement other clearance angles and rake angles are formed. In the most unfavorable case, during the cutter engagement rake angles of −50° or more can be formed, as a result of which the machining forces rise strongly, which ultimately, given inevitably arising vibration motions, can lead to not inconsiderable production inaccuracies. If the path motion is viewed in the reference system of the workpiece, then each reference point of the cutter moves on a three-dimensional cycloid. If the crossed-axes angle is neglected or an angle value of 0° is assumed, the trajectories in the external machining of a workpiece are epicycloids, and in the internal machining hypocycloids. The transmission ratio between the tool and the workpiece is decisively above the number of rollovers of the tool until the same point is reached after a 360° passage.

In order to prevent one or more defective teeth of the tool leading to corresponding defects in the finished workpiece, the number of teeth of the tool is chosen such that the number of teeth of the workpiece is a non-integral multiple. In the case of a non-integral multiple, the situation would namely arise that the tool, as it circulates, always machines the same tooth space with the same tooth, so that geometric abnormalities of a "cutting tooth" of the tool cause corresponding workpiece defects. Thus, a transmission ratio without a common denominator or with a prime number is preferably chosen, i.e. for example from 100 teeth of the workpiece to 29 teeth of the tool.

Given a positive crossed-axes angle, from flat cycloids evolve spatial roulettes, which can be used to analyze the motional paths of the faces of the tool. The kinematics of gear skiving turns out to be a complex motion in which each cutter of a tooth of the tool immerses successively into a tooth space of the workpiece and continues this radial motion in a rolling-down fashion as far as the tooth bottom, after which the tooth cutter on the opposite wall of the tooth space is moved back out. During the immersion and the withdrawal, the tool tooth cutter moves axially along the workpiece tooth width. The rake angle changes constantly and can even assume high negative values of up to −50°. At such high negative rake angles, the tools are placed under extreme load by the increasing cutting forces, which can give rise to considerable tool wear. Although the tools can be reground or exchanged for new tools, such works lead to downtimes in the production, which minimize the effectiveness of the process. In the case of conical tools, there is the added factor that the number of regrinding possibilities is limited due to the cone.

SUMMARY OF THE INVENTION

Based on these insights, an object of the present invention is to define a method for determining the flank face contour of a gear skiving tool, a gear skiving tool, and a use thereof which allows a cutting operation which is gentler on the tools and offers a higher productivity rate.

According to the invention, a method is provided for determining the flank face contour, more particularly the clearance angle, of a blade-like tool or work tooth of a tool for the gear skiving of workpieces. The method includes a first step in which the face contour of the tool is defined and the progression of the path motion of the face of the tool during metal-cutting gear skiving is calculated, taking into account a predefined or predefinable transmission ratio between the tool and the workpiece, which transmission ratio is determined by the respective number of teeth, and the desired tooth cross-sectional contour of the workpiece. In a second step, the tangential velocity of each point of the cutting edge of the tool during metal-cutting gear skiving is determined in the form of vectors, and these vectors are represented graphically as bundles at each point of the cutting edge and a closed envelope surface, within which no vectors lie, is determined. This envelope surface, plus the desired clearance angle, is chosen as the shape for the tool flank face or flank face of a tool tooth.

According to another aspect of the invention, a tool for gear skiving is provided comprising a plurality of teeth, each of the teeth having faces with cutting edges and hereto adjoining flank faces. The teeth are arranged on a cylindrical or conical shell. The tool can be driven rotatingly about a tool axis spaced a radial distance away from the workpiece axis and can be advanced in rolling engagement at a crossed-axes angle between the rotational axis of a driven workpiece and the tool rotational axis. A closed annular envelope surface, within which no tangential velocity vectors lie and in relation to which the flank face of the respective tooth is inclined by 2° to 10°, preferably 3° to 7°, is formed by the bundle of tangential velocity vectors of each cutting edge point.

According to another aspect of the invention, a method is provided including using the tool produced according to the method by a tool guide, the cutting direction being opposite to the feed direction, without teeth of the workpiece having previously been machined with directed feed motion in the cutting direction.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a view of the path motion of the face of a tooth in the engagement region;

FIG. 4 is another view of the path motion of the face of a tooth in the engagement region;

FIG. 5 is another view of the path motion of the face of a tooth in the engagement region;

FIG. 6 is another view of the path motion of the face of a tooth in the engagement region;

FIG. 7 is a view showing an orientation-inverted velocity vector of each cutting edge point of the face plotted at every point of the engagement FIG. 8 is a view showing an orientation-inverted velocity vector of each cutting edge point of the face plotted at every point of the engagement;

FIG. 9 is a view showing two tool engagements in a workpiece gap represented by the motional representatives.

DESCRIPTION OF THE PREFERRED EMBODIMENTS

Figure 1:
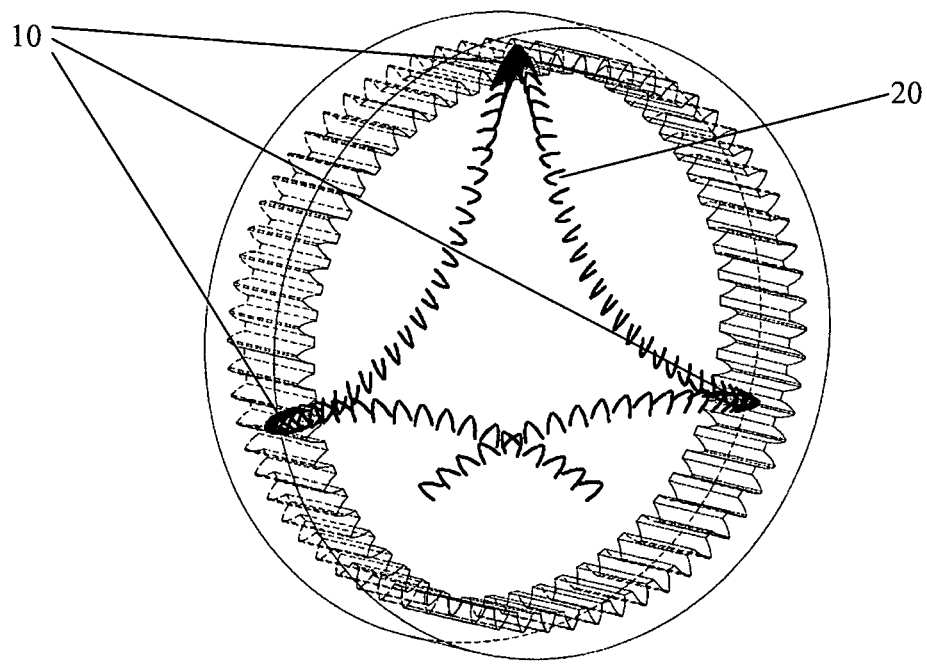
FIG. 1 is a view showing spatial motion of a face of a tool tooth.
Figure 2:
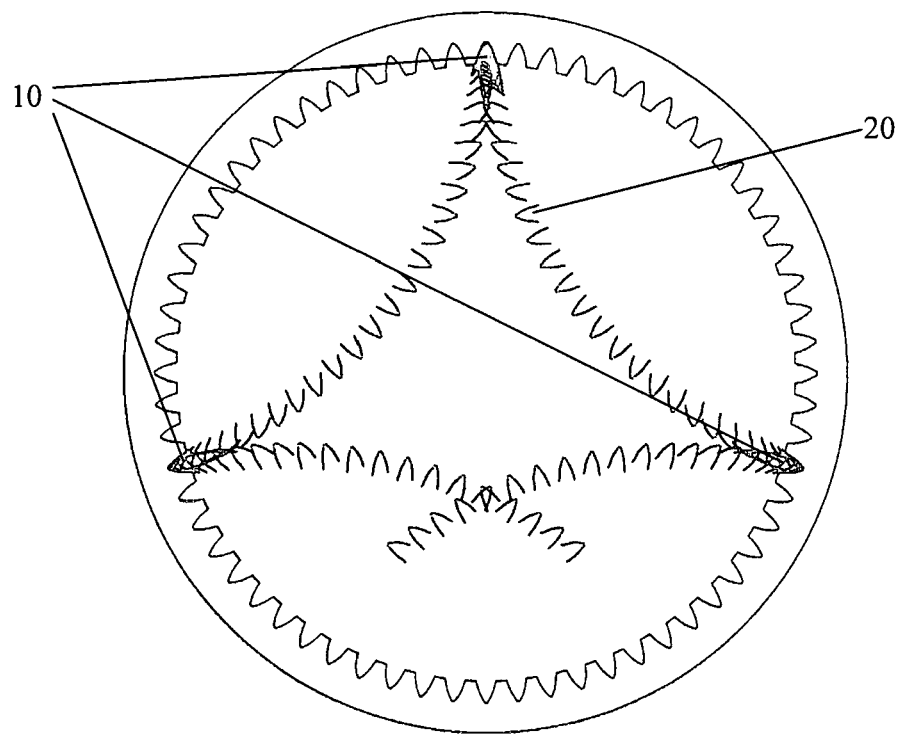
FIG. 2 is a top view, parallel to the workpiece axis, of a spatial motional curve according to FIG. 1.
Figure 10:
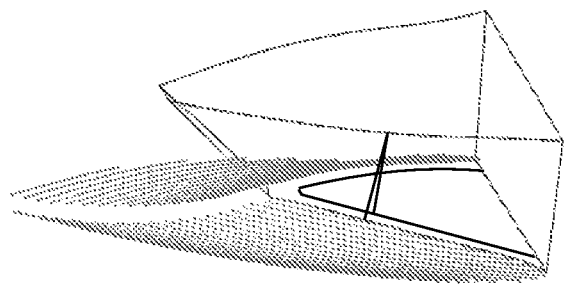
FIG. 10 is a view showing the corrected clearance surface and the clearance angle.

The present invention is based on the following solution approach:

In FIG. 1, the spatial motion of the face 20 of a tool tooth is represented by way of example. In the chosen example, the tool has 19 teeth and the workpiece 64 teeth in total, from which a transmission ratio of 64/19 is obtained. Of particular interest are the engagement regions 10, in which the tool engages cuttingly in the workpiece, i.e. a workpiece tooth space. FIG. 2 shows a top view, parallel to the workpiece axis, of the spatial motional curve according to FIG. 1, in which the engagement regions 10 respectively appear acute-angled. As can be seen from the enlarged view according to FIGS. 3, 4, 5 and 6, which show various views of the path motions of the face of a tooth in the engagement region, the path curvature changes constantly during the immersion and emergence of the tool into/from the workpiece tooth space. The face which is oriented approximately radially in the engagement region cuts the workpiece at entry 11 into a tooth space at a positive rake angle, which, up to exit 12 from the tooth space, changes toward a strongly negative rake angle. In FIG. 6 is additionally recorded a path motion representative 13, which represents the motional path and the direction of cut as a curved arrow. As can be seen, in particular, from the view in FIG. 7, which view is projected into a plane, the velocity vector which is assigned to each point of the active cutting edge bounding the face, and which consists of a scalar amount and the motional direction, changes in the course of passage through a tooth space. In FIG. 6 is additionally recorded a path motion representative 13, which represents the motional path and direction of cut as a curved arrow. For the present invention, the directional component of the velocity vector is of particular importance. If, as represented in FIGS. 7 and 8, the orientation-inverted velocity vector of each cutting edge point of the face is plotted at every point of the engagement, then a bundle 21 of velocity vectors is acquired, which vectors form a closed envelope surface 22 within which no velocity vectors lie. This envelope surface, plus a desired clearance angle, which preferably lies between 2° and 10°, determines the flank face contour of the tool tooth. In FIG. 8, at a distance of about 5 mm from the face 20 is drawn a face 23, which—minus a marginal region 24 determined by the choice of clearance angle—corresponds to the base of the cutting tooth of a tool. In other words, if the envelope surface 22 were chosen as the flank surface, the clearance angle would be 0°, which has to be correspondingly corrected to form a positive clearance angle.

The above-described tool is capable, on the basis of the chosen clearance angle, of immersing radially to a full depth or maximum advance. After the immersion motion, the feed in the direction opposite to the cutting motion can take place. In this way, the entry of the tool in the engagement zone can be utilized for the metal cutting. In this zone, the effective rake angles are positive.

In FIG. 9, two tool engagements in a workpiece gap are represented by the motional representatives 13a and 13b. If the feed takes place, as proposed in this invention, oppositely to the cutting motion, then 13a represents the first engagement and 13b the second engagement in the workpiece gap. The volume of metal removed is represented by the area 14. The metal cutting is hence realized at the entry of the tool tooth, where the effective rake angles are positive, which is qualitatively represented by the mean rake angle curve 15.

If the feed takes place in the same direction as the cutting motion, the exit zone of the tool tooth is used for the metal cutting and the metal cutting is realized at an effectively strongly negative rake angle, which results in high cutting forces within the process. In practice, the attainable qualities and tool lives are therefore limited.

The fundamental advantage of the invention lies in the use of that section of movement during the engagement in which the rake angles are positive. Compared to the prior art, in this process management the chip can slide more easily over the face and more heat is evacuated via the chip. Thus adhesion of the chip on the face is also lessened.

The above considerations apply, of course, also to blade-like tools, which are described, for instance, in DE 20 2011 050 054 U1.

The method according to the invention can be applied to determine the flank face contour in any tool whose number of teeth and number of blades is preselected. The graphic representation of the path motion of the face of the tool tooth, as well as the determination of the respective tangential velocity of each cutting edge point, can be drawn up without great effort via a computing program, from which is obtained an exactly contoured envelope curve, which, minus the desired clearance angle, allows a geometrically clearly defined flank face to be determined. The computer-aided simulation of the path motions of a face, which in the simplest case can be of flat configuration, enables an optimization of the flank face geometry and, at the same time, an optimization of the machine-cutting process, in which the tool is guided such that the immersion region of the tool tooth into the workpiece tooth space is utilized for the metal cutting. The tool can be configured as a monobloc, i.e. as a one-piece tool or as an assembly comprising exchangeable tools (cutting inserts, blades). The tool preferably consists of a tool steel produced by powder-metallurgical means or of a hard metal; it works with and without a face offset and the toothings to be produced can be internal and external toothings, straight and oblique toothings.

According to the workpiece material and the chosen cutting operation, the clearance angles lie within the range from 3° to 7° in order to prevent the chosen wedge angles from becoming too small, which would increase the fragility of the cutting edges.

Preferably, the absolute rake angle lies between +10° and −30°, wherein, as a result of the tool setting angles in the metal cutting, at least upon immersion into a tooth space of the workpiece, the effective rake angle is positive.

The tool for gear skiving, comprising a plurality of teeth, each having faces with cutting edges and hereto adjoining flank faces, which teeth are arranged on a cylindrical or conical shell, wherein the tool can be driven rotatingly about a tool axis spaced a radial distance away from the workpiece axis and can be advanced in rolling engagement at a crossed-axes angle between the rotational axis of a driven workpiece and the tool rotational axis, is designed such that a closed annular envelope surface, within which no tangential velocity vectors lie and in relation to which the flank face of the respective tooth is inclined by 2° to 10°, preferably 3° to 7°, is formed by the bundle of tangential velocity vectors of each cutting edge point. The number of teeth is determined by the transmission ratio.

Preferably, said tool is used in such a way that the cutting direction is opposite to the feed direction, without teeth of the workpiece having previously been machined with a feed motion directed in the cutting direction. As a result of the design of the flank face, the tool, in the metal cutting process, can be advanced to the full depth of the workpiece tooth and withdrawn. In this way, the entry zone of the tool tooth is utilized for the metal cutting. In this zone, effective rake angles are positive, and thus the metal cutting forces are lower than in metal cutting using the exit zone. The metal cutting forces, and thus the excitations in the process, are thus reduced to a minimum.

While specific embodiments of the invention have been shown and described in detail to illustrate the application of the principles of the invention, it will be understood that the invention may be embodied otherwise without departing from such principles.

The invention claimed is:

1. A method for determining the flank face contour, including a clearance angle, of a blade-like tool or work tooth of a tool for the gear skiving of workpieces, the method comprising:
   defining the contour of the face of the tool, the face having cutting edges and calculating the progression of the path motion of the face of the tool during metal-cutting gear skiving relative to a rotating workpiece, wherein the relative motion is defined by a predefined or predefinable transmission ratio between the tool and the workpiece and a crossed-axis angle between a rotational axis of the workpiece and a rotational axis of the tool, which transmission ratio is determined by a respective number of teeth, and a desired tooth cross-sectional contour of the workpiece;
   determining a tangential velocity of each point of a cutting edge of the tool during metal-cutting gear skiving relative to the workpiece in the form of vectors, and representing the vectors graphically as bundles of lines in a direction opposite to the direction of motion at each point of the cutting edge and determining a closed envelope surface, within which no lines lie; and
   choosing the envelope surface, plus a desired clearance angle as the shape for the tool flank face or flank face of a tool tooth.

2. The method as claimed in claim 1, wherein the clearance angle is chosen to be between 2° and 10°.

3. The method as claimed in claim 1, wherein a chosen absolute rake angle lies between +10° and −30°.

4. The method as claimed in claim 1, wherein the clearance angle is chosen to be between 3° and 7°.

5. The method as claimed in claim 1, wherein, as a result of tool setting angles in the metal cutting, at least upon immersion into a tooth space of the workpiece, a positive effective rake angle is chosen.

6. A method for determining the flank face contour, including a clearance angle, of a blade-like tool or work tooth of a tool for the gear skiving of workpieces, the method comprising:
   defining the contour of the face of the tool, the face having cutting edges, and calculating the progression of the path motion of the face of the tool during metal-cutting gear skiving relative to a rotating workpiece, wherein the relative motion is defined by a predefined or predefinable transmission ratio between the tool and the workpiece and a crossed-axis angle between a rotational axis of the workpiece and a rotational axis of the tool, which transmission ratio is determined by a respective number of teeth, and a desired tooth cross-sectional contour of the workpiece;
   determining a tangential velocity of each point of a cutting edge of the tool during metal-cutting gear skiving relative to the workpiece in the form of vectors, and representing the vectors graphically as bundles of lines in a direction opposite to the direction of motion at each point of the cutting edge and determining a closed envelope surface, within which no lines lie;

choosing the envelope surface, plus a desired clearance angle as the shape for the tool flank face or flank face of a tool tooth; and producing a tool with the determined flank face contour including the clearance angle to provide the blade-like tool or tool with work teeth for the gear skiving of workpieces, and providing the tool with a tool guide, cutting direction opposite the feed direction, wherein teeth of the workpiece are machined in the cutting direction opposite to the feed direction.

7. A method for determining a flank face contour, including a clearance angle, of a tool or work tooth of a tool for gear skiving of workpieces, the method comprising:

defining a tool face contour of a flank face of a tool structure, the tool face contour comprising cutting edges;

determining a transmission ratio between the tool structure and a rotating workpiece structure and a crossed-axis angle between a rotational axis of the workpiece and a rotational axis of the tool structure based on a number of teeth and a desired tooth cross-section contour of the workpiece structure;

calculating motion of the flank face of the tool structure relative to the workpiece during a metal-cutting gear skiving process based on at least the transmission ratio;

determining a vector of each point of a cutting edge of the tool structure to provide a number of vectors, each of the vectors corresponding to a tangential velocity of each point of the cutting edge of the tool structure during the metal-cutting gear skiving process relative to the workpiece, wherein the vectors are displayed graphically as bundles of lines in a direction opposite to a direction of motion at each point of the cutting edge;

determining a closed envelope surface, wherein no lines are provided in the closed envelope surface; and choosing the envelope surface and a desired clearance angle as a shape for the flank face of the tool structure or the flank face of a tool tooth of the tool structure.

8. The method as claimed in claim 7, wherein the clearance angle is chosen to be between 2° and 10°.

9. The method as claimed in claim 7, wherein a chosen absolute rake angle lies between +10° and −30°.

10. A method according to claim 7, further comprising:

producing a tool with the determined flank face contour including the clearance angle to provide the blade-like tool or tool with work teeth for the gear skiving of workpieces, and providing the tool with a tool guide, cutting direction opposite the feed direction, wherein teeth of the workpiece are machined in the cutting direction opposite to the feed direction.

11. The method as claimed in claim 7, wherein the clearance angle is chosen to be between 3° and 7°.

12. The method as claimed in claim 7, wherein, as a result of tool setting angles in the metal cutting, at least upon immersion into a tooth space of the workpiece, a positive effective rake angle is chosen.

* * * * *